United States Patent
Lair

(12) 
(10) Patent No.: US 6,820,410 B2
(45) Date of Patent: Nov. 23, 2004

(54) BIFURCATED TURBOFAN NOZZLE

(75) Inventor: Jean-Pierre Lair, San Antonio, TX (US)

(73) Assignee: The NORDAM Group, Inc., Tulsa, OK (US)

( * ) Notice: Subject to any disclaimer, the term of this patent is extended or adjusted under 35 U.S.C. 154(b) by 11 days.

(21) Appl. No.: 10/440,933

(22) Filed: May 19, 2003

(65) Prior Publication Data

US 2004/0187476 A1 Sep. 30, 2004

Related U.S. Application Data

(60) Provisional application No. 60/382,397, filed on May 21, 2002.

(51) Int. Cl.[7] .............................................. B63H 11/00
(52) U.S. Cl. ............................. 60/204; 60/230; 60/771; 239/265.11
(58) Field of Search ................................ 60/204, 226.1, 60/226.2, 226.3, 230, 262, 771; 239/265.11, 265.13, 265.17, 265.19, 265.37, 265.39, 265.43; 244/1 R, 1 N, 53 R, 54, 55, 58, 59

(56) References Cited

U.S. PATENT DOCUMENTS

| | | | |
|---|---|---|---|
| 3,137,131 A | * | 6/1964 | Tyler et al. ............. 239/265.11 |
| 3,892,358 A | | 7/1975 | Gissien |
| 4,278,220 A | | 7/1981 | Johnston et al. |
| 4,420,932 A | * | 12/1983 | Mendez et al. ................ 60/230 |
| 5,251,435 A | * | 10/1993 | Pauley ....................... 60/226.1 |
| 5,833,140 A | * | 11/1998 | Loffredo et al. ........ 239/265.37 |
| 5,853,148 A | | 12/1998 | Standish et al. |
| 2003/0146296 A1 | * | 8/2003 | Braga Da Costa Campos .. 239/265.11 |

OTHER PUBLICATIONS

U.S. patent application No. 10/338,499; filed Jan. 8, 2003; Jean-Pierre Lair.

* cited by examiner

*Primary Examiner*—Justine R. Yu
*Assistant Examiner*—John F. Belena
(74) *Attorney, Agent, or Firm*—Francis L. Conte

(57) ABSTRACT

A turbofan exhaust nozzle includes a fan duct defined between a fan nacelle and a core engine cowling. The fan duct includes a longitudinal endwall and a partition spaced therefrom to define a secondary flow duct. The fan duct also includes a primary outlet, and the secondary duct includes a secondary outlet. The partition between the two ducts includes an aperture covered by a selectively movable flap.

25 Claims, 5 Drawing Sheets

BIFURCATED TURBOFAN NOZZLE

This application claims the benefit of U.S. Provisional Application No. 60/382,397; filed 05/21/2002.

BACKGROUND OF THE INVENTION

The present invention relates generally to turbofan aircraft gas turbine engines, and, more specifically, to noise attenuation therein.

In an aircraft turbofan engine, air is pressurized in a compressor and mixed with fuel in a combustor for generating hot combustion gases which flow downstream through turbine stages that extract energy therefrom. A high pressure turbine powers the compressor, and a low pressure turbine powers a fan disposed upstream of the compressor.

The combustion gases are discharged from the core engine through an annular exhaust nozzle, and the fan air is discharged through another exhaust nozzle surrounding the core engine. The majority of propulsion thrust is provided by the pressurized fan air discharged from the fan exhaust nozzle, and remaining thrust is provided from the combustion gases discharged from the core exhaust nozzle.

The core exhaust flow is discharged from the core nozzle at high velocity and then mixes with the high velocity fan air discharged from the fan nozzle as well as with ambient air through which the engine and aircraft travel. The high velocity exhaust flow generates significant noise during operation, with additional noise being generated by the fan exhaust, as well as by the rotating components of the engine.

Turbofan aircraft engines have various designs including low bypass, high bypass, and long or short duct nacelles. And, these various designs may include various features for attenuating noise corresponding with the specific noise source. However, noise attenuation features typically add weight to the engine, and it is desirable to minimize engine weight in an aircraft turbofan engine.

The noise sources in a typical turbofan engine include both the velocity of the fan discharge stream itself, and mechanical noise due to rotation of the engine rotor components during operation. The large fan blades must be rotated at suitable rotational speeds at which tip speeds range from subsonic through transonic and even supersonic. The fan blades therefore generate a significant component of noise during operation.

However, attenuation of exhaust noise or mechanical noise of the fan typically requires different solutions specific thereto.

Accordingly, it is desired to provide an aircraft turbofan engine with an improved fan exhaust nozzle for specifically attenuating fan noise due to discharge velocity of the fan exhaust during takeoff operation.

BRIEF SUMMARY OF THE INVENTION

A turbofan exhaust nozzle includes a fan duct defined between a fan nacelle and a core engine cowling. The fan duct includes a longitudinal endwall and a partition spaced therefrom to define a secondary flow duct. The fan duct also includes a primary outlet, and the secondary duct includes a secondary outlet. The partition between the two ducts includes an aperture covered by a selectively movable flap.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
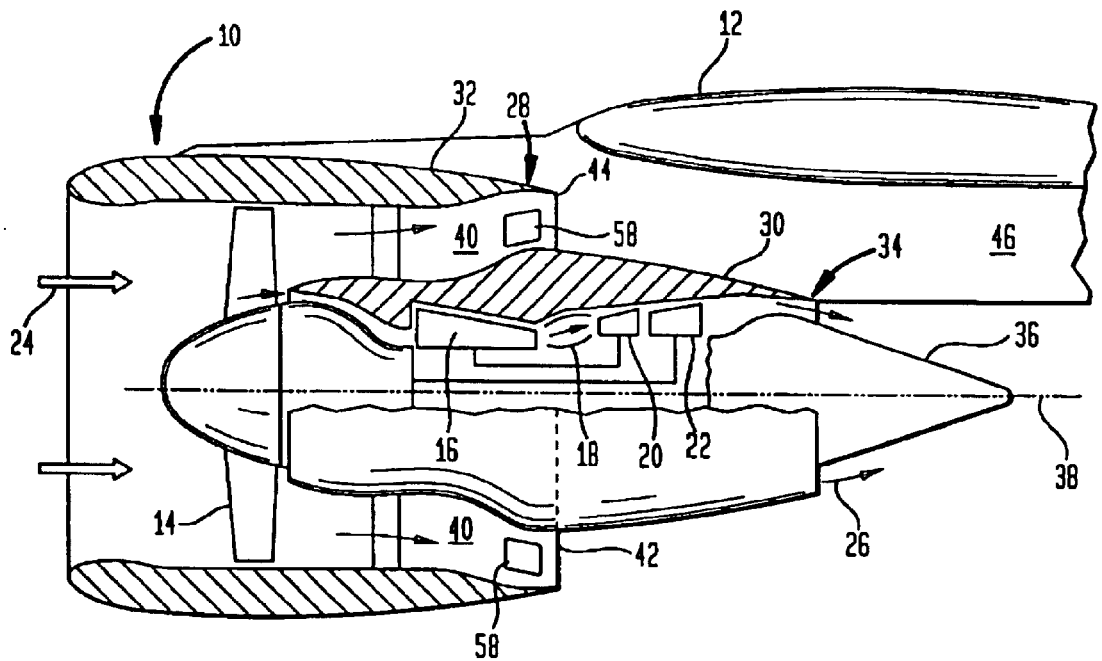
FIG. 1 is an axial sectional view through an exemplary turbofan engine mounted by a pylon to the wing of an aircraft, and including a variable area fan nozzle in accordance with an exemplary embodiment of the present invention.

Illustrated in FIG. 1 is an exemplary turbofan aircraft gas turbine engine 10 mounted by a pylon to the wing of an aircraft 12, shown in part. The engine includes in serial flow communication a fan 14, multistage axial compressor 16, annular combustor 18, high pressure turbine 20, and low pressure turbine 22.

During operation, ambient air 24 is pressurized in the compressor and mixed with fuel in the combustor for generating hot combustion gases 26 which flow through the high and low pressure turbines that extract energy therefrom. The high pressure turbine powers the compressor through a shaft therebetween, and the low pressure turbine powers the fan through another shaft therebetween.

The exemplary turbofan engine illustrated in FIG. 1 is in the form of a high bypass ratio engine in which most of the air pressurized by the fan bypasses the core engine itself for generating propulsion thrust. The fan air 24 is discharged from the engine through a substantially annular fan exhaust nozzle 28 defined radially between an outer shell or cowling 30 of the core engine and a fan nacelle 32 surrounding the fan and the forward portion of the core engine.

Figure 2:
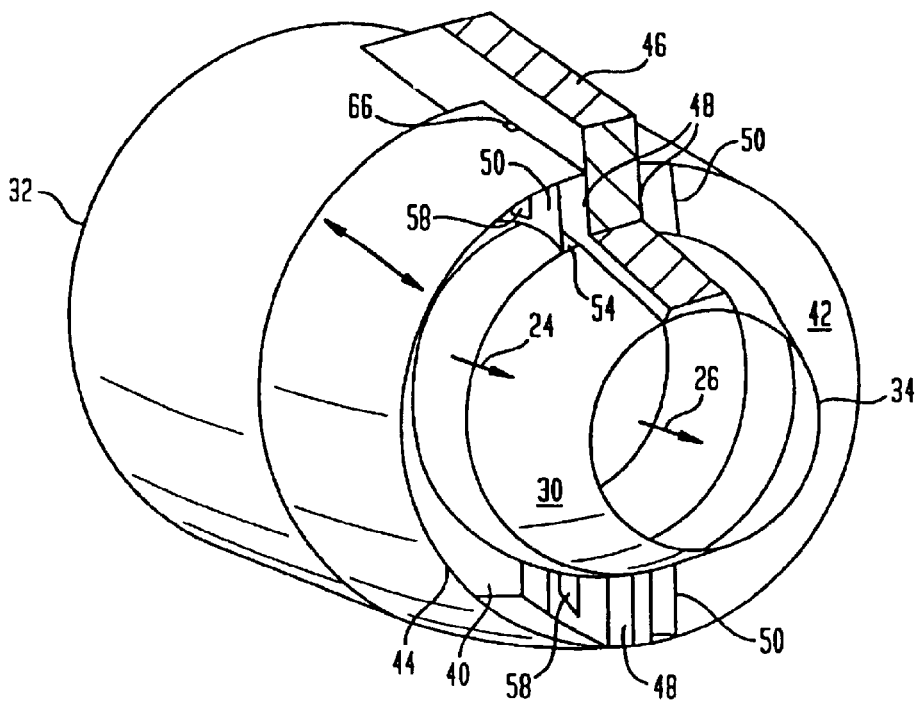
FIG. 2 is an isometric view of the turbofan engine illustrated in FIG. 1 with an exemplary embodiment of the fan nozzle thereof.

The fan nozzle 28 is illustrated in more detail in FIG. 2 in which the fan nacelle 32 coaxially or concentrically surrounds the core engine cowling 30 to define a circumferentially extending fan duct 40 radially therebetween for discharging axially the fan air 24 pressurized by the upstream fan 14. As initially shown in FIG. 1, the fan duct 40 has a tubular inlet at the leading edge of the fan nacelle and an arcuate outlet 42 disposed radially between the cowling and a trailing edge 44 of the nacelle from which the fan air is discharged during operation for providing propulsion thrust to power the aircraft in flight.

The core exhaust gases 26 are discharged from the core engine through an annular core exhaust nozzle 34 defined between the core cowling 30 and an optional center plug 36 disposed coaxially or concentrically therein around an axial centerline axis 38 of the engine and plug.

The turbofan engine illustrated in FIGS. 1 and 2 is attached to the wing by a vertical pylon 46 which interrupts the circumferential continuity of the fan duct. Arcuate portions of the fan nacelle and core cowling are joined together at circumferentially opposite endwalls 48 which result in the fan ducts being C-shaped in two complementary halves which are typically hinge mounted to the pylon for permitting access inside the engine. The C-shaped fan ducts and their longitudinal or axial endwalls 48 may have any conventional configuration, and are typically mounted to the pylon for axial translation movement therealong for uncovering conventional thrust reversers (not shown) in a typical manner.

Figure 3:
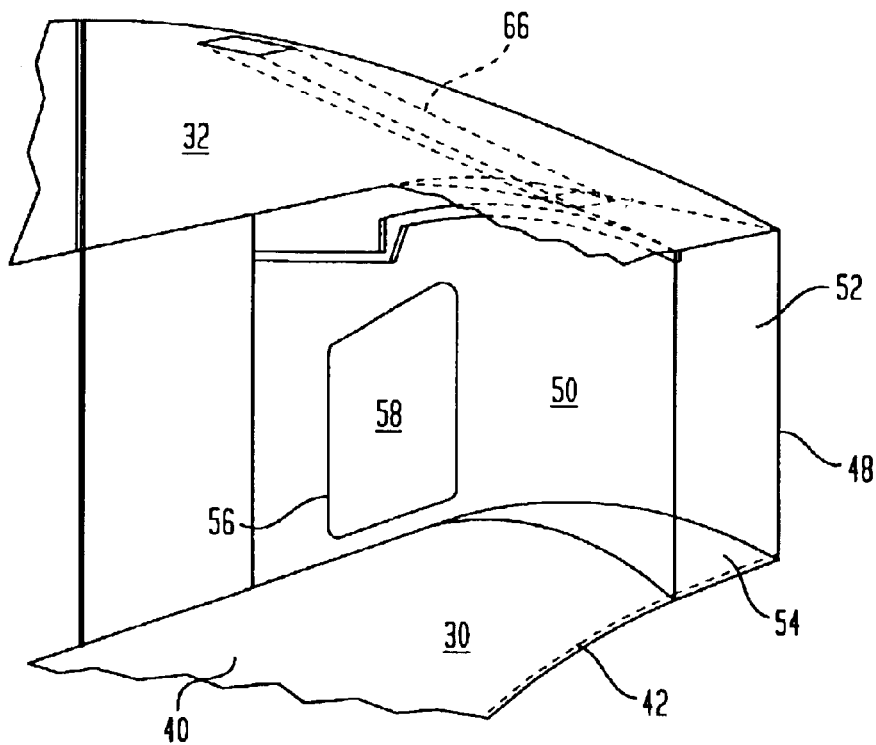
FIG. 3 is an isometric view of a portion of the fan nozzle illustrated in FIG. 2 including a secondary flow duct.

However, the exemplary fan nozzle illustrated in FIGS. 1–3 may be modified in accordance with the present invention for introducing therein another longitudinal wall or partition 50 spaced from a corresponding endwall 48 to define a secondary fan flow duct 52 behind the partition.

Since the pylon illustrated in FIG. 2 interrupts the circumferential continuity of the annular fan duct, the two C-shaped fan duct halves have corresponding endwalls 48 on opposite sides of the pylon. And, the two C-ducts 40 have another pair of the endwalls 48 at their lower ends opposite to the pylon. Correspondingly, a pair of the partitions 50 may be introduced at the top of the fan ducts, or at the bottom thereof, or at both locations to correspondingly define the two or four secondary flow ducts 52 at opposite circumferential ends of the two primary fan ducts 40.

Whereas the primary ducts 40 have corresponding arcuate primary outlets 42 which extend over the majority of the circumferential extent of the engine, the secondary ducts 52 have correspondingly small secondary outlets 54 which occupy a relatively minor portion of the circumferential extent of the engine. The secondary outlets 54 are generally rectangular in area, and circumferentially adjoin the arcuate primary outlets 42 in a common annulus therewith interrupted by the pylon at the top of the engine, and the endwalls 48 at the bottom of the engine.

The primary and secondary ducts 40,52 are fixed-area structures, with the common trailing edge 44 of the fan nacelle having a constant radial spacing from the common outer diameter of the core cowling 30.

Figure 4:
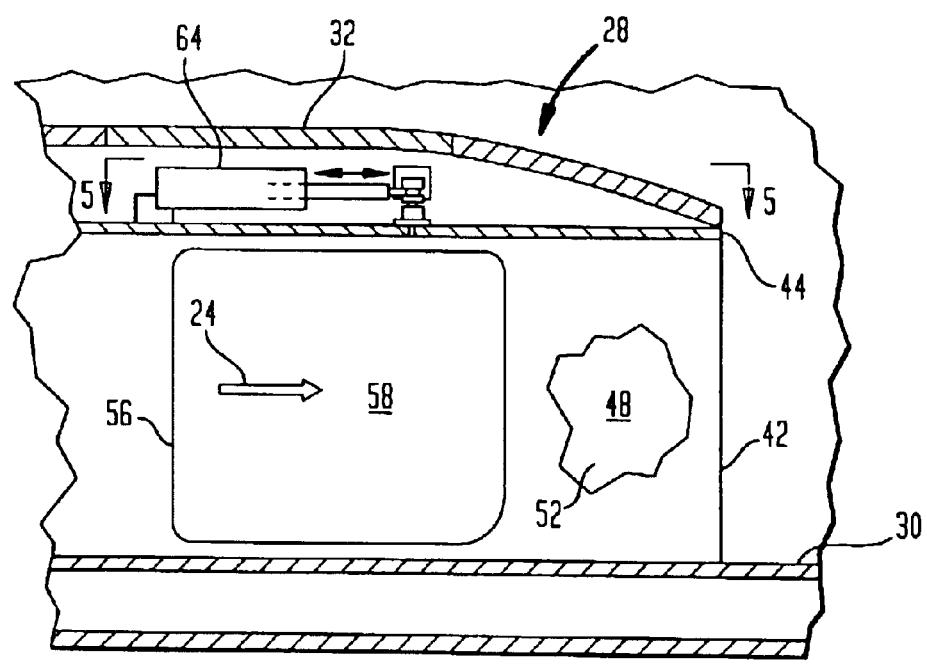
FIG. 4 is an enlarged sectional view of a portion of the variable fan nozzle illustrated in FIG. 1.

However, variable area capability may be introduced into the fan nozzle with the circumferential bifurcation of the C-ducts 40 by the introduction of the partitions 50 and secondary flow ducts 52. As shown in FIGS. 3 and 4, each partition includes a portal or aperture 56 initially covered by a suitably movable door or flap 58. In this way, the flaps 58 may be suitably opened when desired for providing flow communication between the primary ducts and the secondary ducts for selectively increasing the collective outlet flow area for the fan nozzle.

This new configuration of the fan nozzle may be used to advantage in a method for reducing noise in the engine which otherwise has fixed-area outlets in the primary and secondary ducts. The flaps 58 may be simply opened during takeoff operation for temporarily increasing the circumferential flow area of the fan ducts for correspondingly reducing velocity of the fan air being discharged from the engine.

In this exemplary turbofan engine, a major component of noise generation is due to the high velocity of the fan discharge air as it mixes with the relatively low velocity of the surrounding ambient airstream during aircraft flight. By opening the flaps 58, the secondary ducts and their corresponding outlets provide a temporary increase in available flow area for discharge of the fan air, which therefore reduces the velocity thereof and correspondingly reduces noise during takeoff.

And, when the aircraft being powered by the engine reaches cruise operation at a predetermined altitude above sea level, the flaps 58 may be suitably closed for blocking flow discharge through the secondary ducts and terminating the area increase. Then at cruise operation of the engine, the reduced flow area attributable solely to the primary ducts 40 then ensures efficient operation of the engine at cruise altitude which does not require the additional discharge flow area useful during takeoff operation.

In this way, the fan nozzle is provided with variable area capability with otherwise fixed-area outlets 42,54 by the simple introduction of the secondary ducts and the selective communication therebetween provided by the movable flaps. The primary ducts 40 may therefore be optimally sized for maximizing cruise performance of the engine at altitude with a suitably small collective flow area at the primary outlets 42. And, the secondary outlets 54 may be optimized for takeoff operation to provide a temporary increase in total fan air discharge area.

Figure 5:
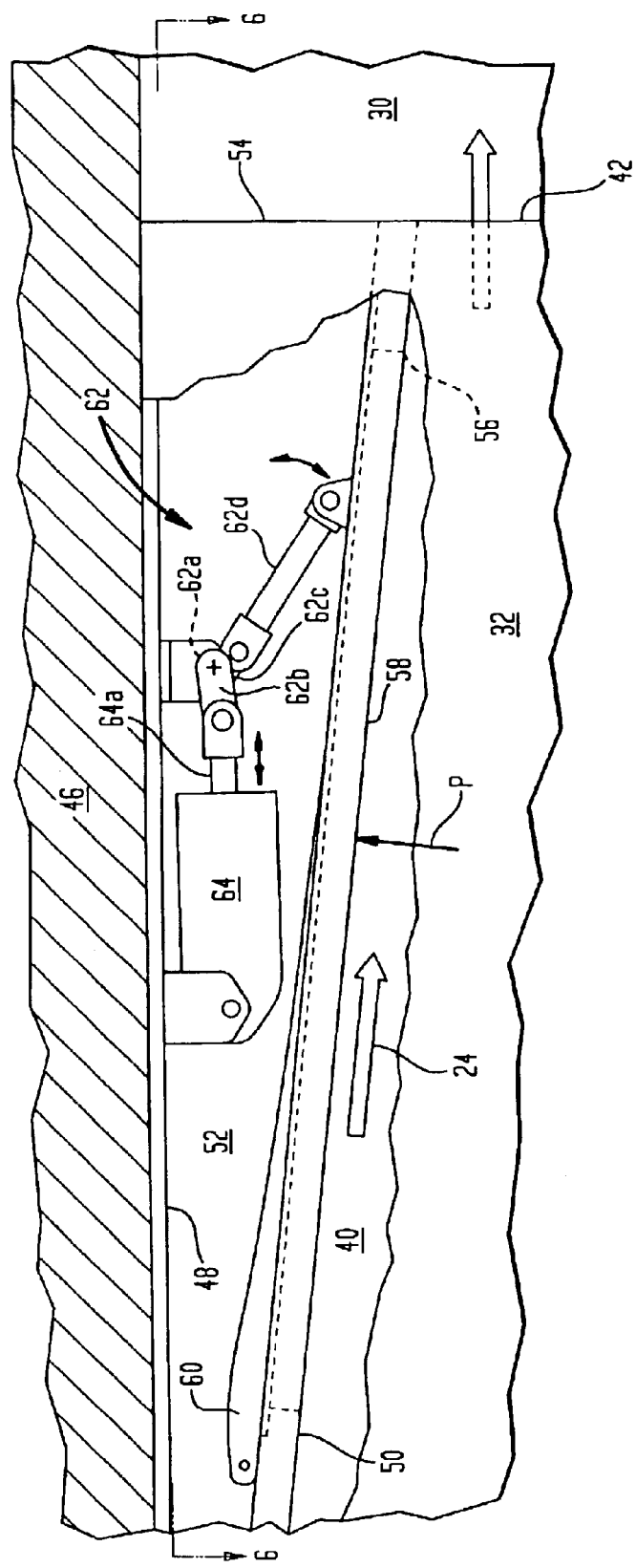
FIG. 5 is a top, partly sectional view of a portion of the fan nozzle illustrated in FIG. 4 and taken along line 5—5.
Figure 6:
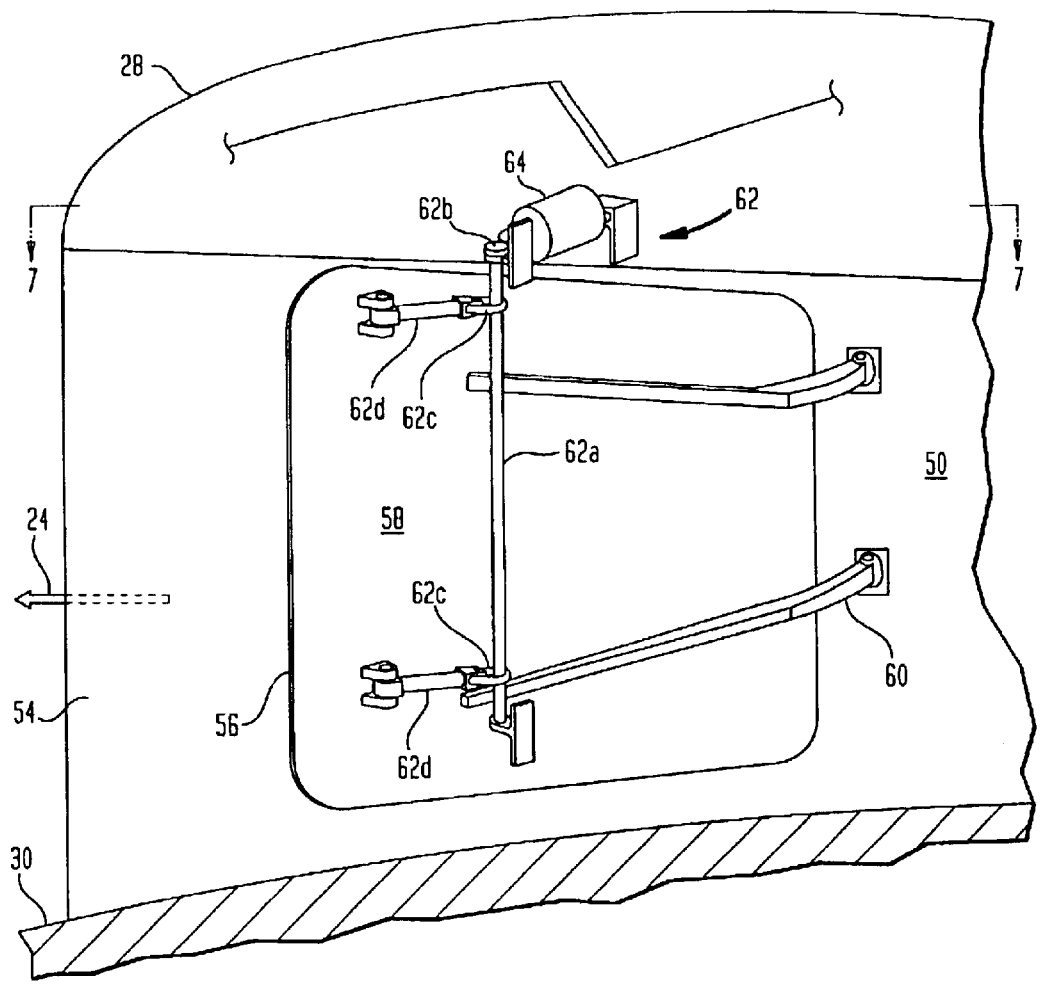
FIG. 6 is a partly sectional axial view inside the secondary fan duct illustrated in FIG. 5 and taken along line 6—6.
Figure 7:
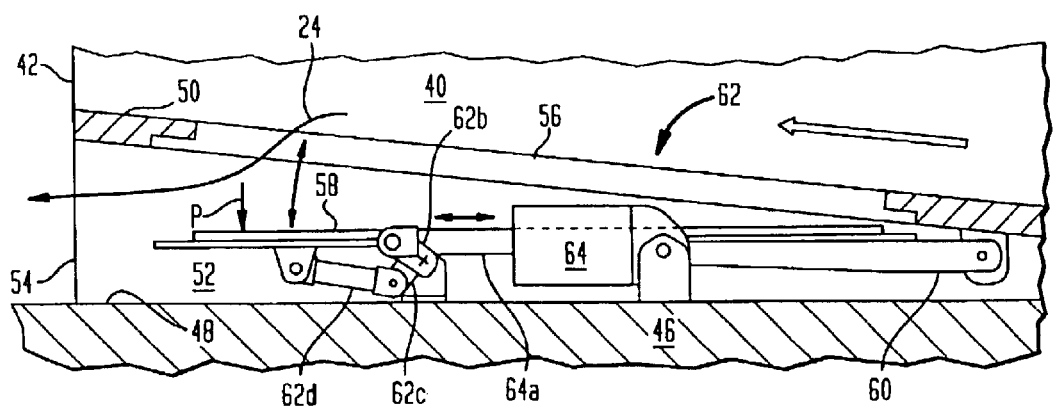
FIG. 7 is a top, partly sectional view of the secondary flow duct illustrated in FIG. 6 and taken along line 7—7.

FIGS. 5–7 illustrate an exemplary embodiment in which suitable means are provided for selectively moving the flaps 58 between stowed and deployed positions for correspondingly blocking and unblocking the partition apertures 56 for varying the area available for discharging the fan exhaust. The flaps are preferably normally closed in their stowed position sealingly blocking the corresponding apertures 56 to prevent flow discharge of the fan exhaust air through the secondary flow ducts 52. The flaps are preferably stowed for cruise operation which requires minimum discharge area for the fan exhaust.

The flaps may then be moved to their deployed and open position in which the partition apertures are unblocked for discharging a minor portion of the fan air from the primary ducts 40 through the secondary ducts for discharge through the secondary outlets. In this way, the fan air from the common fan is collectively discharged through both primary and secondary fan ducts and their corresponding primary and secondary outlets 42,54 for providing maximum area for discharging the fan exhaust during takeoff.

The introduction of the partitions and movable flaps in the otherwise conventional fan nozzle requires relatively few additional components and is relatively simple in configuration. The trailing edge of the fan nacelle remains fixed in space for maintaining a simple design.

It is noted, however, that the aft end of the fan nacelle in which the secondary flow ducts 52 are incorporated may be in the conventional form of a translating sleeve which covers thrust reversers (not shown) during normal operation. When thrust reverse is required during landing of the aircraft, the nacelle sleeve translates aft as shown by the doubled headed arrow in FIG. 2, for uncovering the hidden thrust reverser doors, and then is translated forward when thrust reverse operation is completed. The partitions 50 and corresponding secondary flow ducts 52 may be readily incorporated in the translating sleeve of the fan nacelle in cooperation with the primary C-ducts typically incorporated therein.

Since the C-ducts 40 are provided in pairs in the engine, the secondary ducts 52 are also preferably provided in either one pair at the top or bottom of the engine, or in two pairs threat. The corresponding secondary outlets 54 in two or four multiples may be suitably sized in flow area to significantly increase the total discharge flow area of the fan nozzle during takeoff operation for correspondingly significantly reducing flow velocity of the discharged fan air from the nozzle. By decreasing the velocity of the fan exhaust, a corresponding reduction in fan-generated noise may be achieved.

Furthermore, and independent of noise attenuation, the additional discharge flow area provided by the secondary outlets 54 during takeoff operation may be used for increasing takeoff thrust from the discharged fan exhaust, which may be accompanied by a slight increase in fan rotor speed.

Significant noise attenuation or thrust increase may be obtained by temporarily increasing the fan discharge flow area in the exemplary range of about 5–20 percent which area increase would be collectively provided by the introduction of two or four of the secondary fan ducts and outlets 54.

In the exemplary embodiment illustrated in FIGS. 5–7, the moving means include a suitable hinge mount 60 configured for pivoting an upstream or forward end of each flap 58 to the partition 50. The downstream or aft distal end of the flap is thusly movable inside the secondary duct for unblocking the partition aperture.

The flap 58 may have any suitable construction and composition and is preferably relatively thin. The hinge mount 60 preferably includes reinforcing arms integrally joined to the back side of the flap and mounted in suitable devises attached inside the secondary duct 52.

In the exemplary embodiment illustrated in FIGS. 5–7 the moving means are active for powering open and closed the flaps when desired. In this embodiment, articulated linkage 62 joins the flap to the endwall 48 for kinematically controlling opening and closing pivotal movement of the flap between the stowed and deployed positions. Correspondingly, a suitable actuator 64 is operatively joined to the linkage 62 for selectively deploying and stowing the flap atop the partition aperture.

As shown in FIG. 6, the linkage 62 includes an elongate control rod 62a pivotally joined by suitable devises to the endwall 48 over the width or height of the flap 58. An input lever 62b is fixedly joined to one end of the control rod, and a pair of output levers 62c are fixedly joined to the control rod spaced apart from each other and from the input lever.

A pair of control arms 62d are pivotally joined by suitable devises to the back side of the flap 58 near the downstream, distal end thereof, with opposite ends of the control arms being pivotally joined to respective ones of the output levers 62c.

The actuator 64 as illustrated in FIGS. 5 and 7, includes an extendable output or piston rod 64a which is pivotally joined to the input lever 62b for selectively rotating the control rod to drive the control arms to open and close the flap 58 atop the partition aperture. FIG. 5 illustrates the actuator rod 64a being fully retracted, which in turn drives the linkage for closing and seating the flap 58 over the partition aperture 56. FIG. 7 illustrates full extension of the actuator rod 64a, which correspondingly drives the linkage to pivot open the flap 58 for permitting flow discharge from the primary duct 40 into the secondary duct 52.

Note in FIGS. 5 and 7 that the partition 50 may be simply introduced with a suitable inclination from the corresponding endwall 48 for gradually increasing the flow area of the secondary duct 52 between its upstream and downstream ends. The actual configuration and location of the partition 50 are selected for providing preferred area distribution of the primary fan duct 40 as required for normal operation.

The introduction of the secondary flow ducts 52 may be separately optimized for providing additional discharge flow area for the fan exhaust only when required during takeoff operation. Accordingly, the primary fan ducts 40 may themselves be fixed in area and configuration and optimized specifically for cruise performance, independently of the secondary flow ducts which are specifically configured and optimized for takeoff operation.

The linkage illustrated in FIGS. 5–7 is merely exemplary of suitable linkage which may be introduced for opening and closing the flap as desired. A particular advantage of the linkage illustrated in this embodiment is the ability in a relatively small volume provided by the secondary flow duct 52 to introduce robust and balanced moving means for the flap. The control arms are balanced on opposite edges of the flap, and are powered by the common control rod 62a, and by the common actuator 64 which may be located in the available space inside the fan nacelle and outside the small secondary duct 52.

As shown in FIG. 5, the control arms 62d are inclined forward toward the control rod 62a to join the output lever 62c in a joint located between the control rod and the flap in the illustrated stowed position. In this way, the flap 58 is self-locked in its closed and stowed position when the actuator output rod 64a is fully retracted. Note that the pivot joint between the control arm 62d and the control arm 62a is over-center, or between the centerline of the control rod 62a and the flap. In this position, the control arm 62d is trapped between the control rod and flap and cannot move unless permitted by the actuator.

By powering the actuator 64 for extending its output rod 64a as illustrated in FIG. 7, the control rod 62a rotates the corresponding input and output levers 62b,c which overcomes the initial over-center position of the control arms and permits opening of the individual flap.

Note that the stowed position illustrated in FIG. 5 includes the clockwise over-center of the forward end of the control arm 62d. As shown in FIGS. 6 and 7, the input lever 62b is angularly spaced from the output levers 62c to pivot the adjoining ends of the control arms 62d between the control rod 62a and the endwall 48 to permit static pressure P of the fan air atop the inner surface of the flap to drive open the flap during deployment. In FIG. 7, the output lever 62c has been rotated counterclockwise overcoming the over-center position thereof initially between the control rod and the partition 50.

When the various flaps illustrated in FIG. 2 are closed during cruise operation, fan discharge area is provided solely by the two C-shaped primary fan ducts 40. The adjoining secondary outlets 54 nevertheless provide circumferential continuity of the common annulus of the two opposite fan ducts. Accordingly, in order to reduce undesirable base drag from the inactive secondary flow ducts during cruise operation, means in the exemplary form of a flow conduit or shunt 66 are provided for channeling air through the secondary ducts when the flaps are stowed closed atop the partition apertures. In this way, some air may flow through the secondary ducts when the flaps are closed for reducing or eliminating the base drag.

The conduit 66 is illustrated in FIGS. 2 and 3 in an exemplary embodiment, and preferably extends through the fan nacelle for channeling ambient air external of the fan nacelle through the secondary ducts when the flaps are stowed closed. Other forms of the conduit may be used, and other routing thereof may be used for providing purge air through the secondary ducts when the flaps are closed. For example, the partition may include one or more unblocked purge holes for channeling a portion of the fan exhaust therethrough at all times including both takeoff and cruise operation.

The exemplary shunt conduit 66 illustrated in FIG. 3 includes an inlet in the form of an aperture mounted flush in the outer skin of the nacelle, and an outlet in the form of another aperture suitably located in the secondary duct 52, such as in the top wall thereof.

Figure 8:
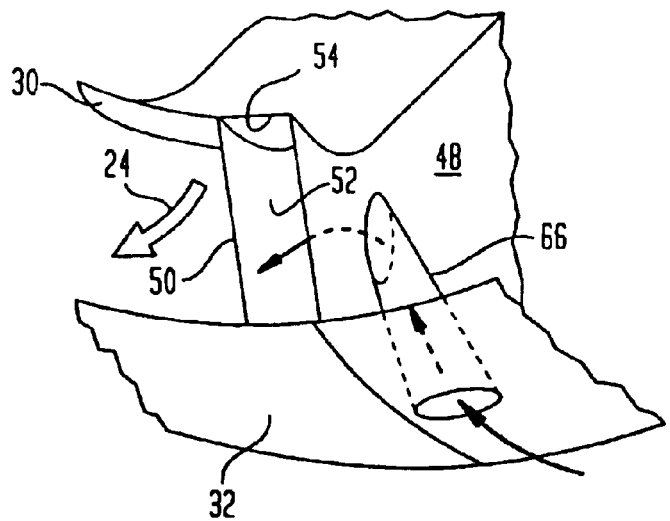
FIG. 8 is an isometric view of a lower portion of the fan duct illustrated in FIG. 1 in accordance with another embodiment.

FIG. 8 illustrates an alternate embodiment of the shunt conduit 66 mounted through the fan nacelle at the bottom of the engine below the pylon. The inlet end of the conduit 66 is mounted flush in the outer skin of the fan nacelle, and the outlet end of the conduit is mounted through the corresponding endwall 48 in the side of the bottom secondary duct 52.

Figure 9:
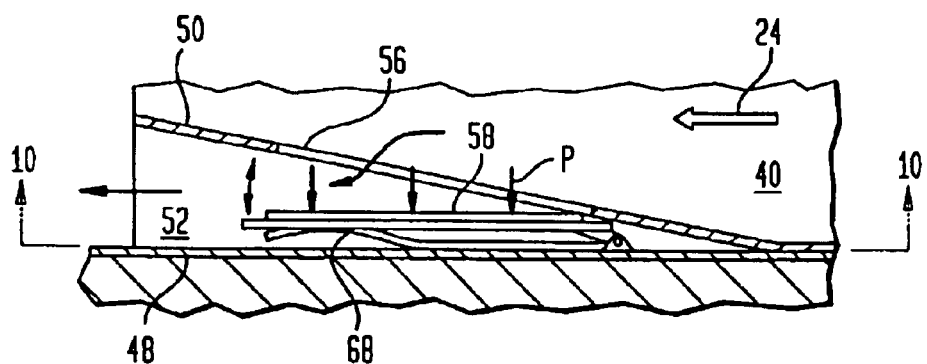
FIG. 9 is a partly sectional top view, like FIG. 7, of a portion of the fan nozzle in accordance with another embodiment.
Figure 10:
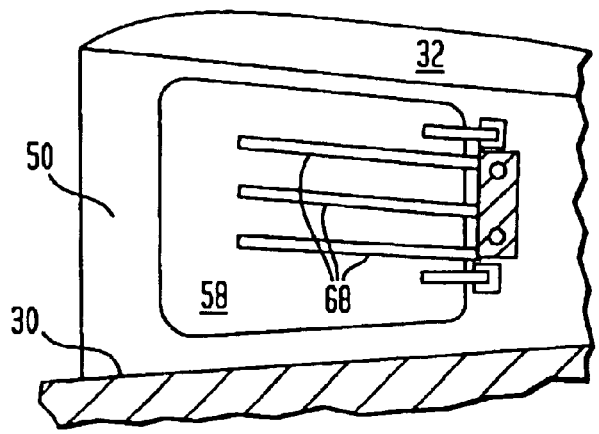
FIG. 10 is a partly sectional, elevational view of the secondary flow duct illustrated in FIG. 9 and taken along line 10—10.

FIGS. 9 and 10 illustrate an alternate embodiment of the flap moving means in the form of one or more springs 68 which are passive devices that do not require an external energy source like the actuator. The springs are disposed between the back side of the flap 58 and the endwall 48 for spring biasing closed the flap atop the partition aperture in the normally closed stowed position.

The springs are sized to permit or utilize static pressure P of the fan air in the primary fan duct 40 to develop a differential pressure across the flap relative to the secondary fan duct 52 as the pressure of fan air increases during takeoff operation of the engine. The springs are sized so that developed static pressure during takeoff is sufficient to overcome the spring returning forces for opening the flap away from the partition aperture.

In this way, static pressure alone of the fan air being discharged through the fan nozzle is sufficient to selectively deploy open the flaps during takeoff. As the power of the engine is decreased for cruise operation, the static pressure of the fan air correspondingly decreases, and the restoring force of the spring 68 is sufficient to self-stow closed the flap atop the partition aperture.

The springs 68 illustrated in FIGS. 9 and 10 may have any suitable form such as the three leaf springs illustrated therein. The proximal ends of the three springs may be suitably clamped to the endwall 48, with the opposite distal ends of the springs slidingly abutting the back side of the flap. In other embodiments, compression, tension, or torsion springs might also be used.

The bifurcated turbofan fan exhaust nozzle disclosed above maintains a fixed-area, substantially annular fan nozzle outlet while introducing variable area capability by circumferential bifurcation of the nozzle. The secondary fan ducts 52 may be sized as small or as large as desired and the secondary outlets thereof typically represent a relatively small percentage of the total fan discharge flow area represented by the primary and secondary outlets.

With the flaps being stowed closed during most engine operation, the fixed-area primary fan ducts and outlets thereof may be optimized for cruise performance. And, when the flaps are opened during takeoff operation, additional fan discharge area is provided by the secondary fan ducts and outlets thereof for temporarily increasing available discharge area for correspondingly reducing the velocity of the discharged fan air through the primary fan duct for reducing engine noise during takeoff.

Additional features of the variable area fan exhaust nozzle have been introduced in the provisional patent application and are summarized hereinbelow. More specifically, the variable area fan exhaust nozzle disclosed above permits automatic adjustment to two extreme positions: a large fan exhaust area and a small fan exhaust area. The large exhaust area is for takeoff from sea level to a preset altitude, while the small exhaust area is for cruise.

Since the noise emitted by high bypass ratio turbofan engines during takeoff is a consequence of the shearing between the fan airflow and the ambient air, it is of particular interest to reduce during takeoff the velocity of the fan airflow so that the shearing between the fan airflow and the ambient air is reduced. To reduce the velocity of the fan airflow during takeoff, the fan exhaust area may be increased.

The bifurcated fan nozzle is of particular interest for a C-duct nacelle with translating sleeve type thrust reversers. With reference to FIG. 2, as known in the art, the fan nacelle is attached to the aircraft structure via the pylon 46. The nacelle is of the C-duct type, and is composed of an air intake, two C-duct halves, an outboard one, an in board one, and a primary exhaust nozzle 28.

With reference to FIGS. 2,3 each half is radially composed of an inner skin usually referred to as inner fan duct, an outer skin usually referred to as outer fan duct, the outer skin of the C-duct and two longitudinal walls or endwalls 48. The inner fan duct and its associated longitudinal walls form a structure that is stationary and usually hinged on the pylon for maintenance access to the engine in a conventional manner.

The assembly C-duct outer skin and outer fan duct with associated closing ribs form that is know in the art as a translating sleeve. The translating sleeve is the structure that supports and houses the thrust reverser of the blocker-type doors and cascades (not shown). The translating sleeve is mounted on associated guiding tracks attached to the fixed walls 48 in a conventional manner.

The inner fan duct, the side walls, and the translating sleeve form a half duct in the shape of a "C" that ducts one half of the total fan airflow mass. The fan airflow 24 exists at the trailing edge 44 of each half C-duct. As the two C-ducts are basically identical, the two C-duct halves may be configured the same way and equipped with the same means for introducing variable area capability.

Conventional C-ducts have a fixed exhaust area. For long range aircraft, the exhaust area is usually optimized for cruise performance conditions. The bifurcated fan nozzle provides a means to adjust the exhaust area of each half of the C-ducts. More particularly it provides a large exhaust area for takeoff and a small exhaust area for cruise.

When the amount of the exhaust area increase required is rather limited, for example in the order of 10% to 15% of the total fan mass flow, the bifurcated nozzle is particularly attractive as it allows a fixed contour C-duct trailing edge, a fixed contour C-duct outer skin, and a fixed contour outer fan duct skin. The nacelle trailing edge is formed by the trailing edge of outer skin and the trailing edge of the outer duct. A significant characteristic of the bifurcated nozzle is that the contours and trailing edge of the C-duct are not altered by the adjustment of the exhaust area of the C-duct. This is an important aspect of the fan nozzle, as all of the prior art known by me use movable parts that move and alter the trailing edge and contours.

Since the fan air flows and exits through two half C-ducts, each half C-duct needs to have the capability to increase its exhaust area, for takeoff, by only half of the value required. In other words and for example, if for takeoff there is a requirement to increase by 12% the exit area for the total fan mass flow, then each C-duct needs to have the capability to increase its exhaust area by only 6%. This aspect is of importance as this small area increase allows designing the contour of the outer fan duct and of the outer skin such that the exit area of the half C-duct is at its maximum value.

With reference to FIG. 2, each half C-duct exhaust area is at maximum when the flaps 58 are open, and half of the total fan mass airflow produced by the engine exhausts through the exhaust area of each half C-duct, formed by the addition of areas from the two primary outlets and the four secondary outlets. The accumulation of areas of the secondary outlets in each C-duct equates to the half of the fan exhaust area increase required.

Consequently, each of the four secondary outlets 54 provides only a quarter of the fan exhaust area increase require This represents the takeoff configuration of each of the two half C-ducts. When the flaps are closed, each half C-duct exhaust area is minimum, and half of the total fan mass airflow produced by the engine exhausts through each of the two primary outlets 52 only. No fan airflow flows through the secondary outlets. This is the cruise configuration of each of the two half C-ducts.

As was explained previously, the nacelle trailing edge, the outer skin, and the outer fan duct have not moved for either value of the exhaust area of the half C-duct. With reference to FIG. 2 there are two longitudinal partition walls 50 installed in the half C-ducts. Each of these walls is attached to the inner fan duct and installed at an inclination angle with their associated longitudinal endwalls of the half C-duct such that their upstream portion is attached to their respective endwalls, and their downstream portion is separated from the respective endwalls.

Each of the partition walls may be made of two parts, a fixed one attached to the inner fan duct and a movable one attached to the outer fan duct of the translating sleeve. In direct thrust mode, takeoff or cruise, the two parts of each partition wall form one entity. In reverse mode, the translating sleeve moves rearward, and the two parts of the partition 50 will be separated from each other.

If the C-duct is equipped with a thrust reverser of the pivoting doors type, or if there is no thrust reverser, then there are no translating sleeves and consequently each of the previous partition walls is made of one part only. For cruise performance purposes, since no fan airflow is flowing through the secondary outlets, it is desirable to limit the magnitude of the value of these outlets in order to avoid generating base drag. For each half C-duct it is possible to only use one secondary outlet instead of two.

With reference to FIG. 3 in the upstream portion of each of the partition walls 50, here is an opening 56. A flap 58 is hinged on its associated partition and is either closing the opening or opening it. With the flap closed, the system is in the cruise configuration, and the primary outlet 42 provides the exhaust area for half of the total fan mass airflow. With the flap opened, the system is in the takeoff configuration, and the exhaust area is the combination of the primary and secondary outlets.

With reference to FIGS. 3,7, the flap 58 is hinged along a hinge axis on the fixed partition wall 50. With reference to FIGS. 5,6,7, arms 62d control the position of the flap. One end of the arms connects to its associated clevis fitting, while the other end connects to rod 62a hinged on longitudinal wall 48 via support fittings.

Actuator 64 is pivotally mounted on a fitting attached to longitudinal wall 48 inside the space formed by the fixed partition wall and associated longitudinal wall. Piston rod 64a of actuator 64 connects to extension lever 62b of the control rod.

As is shown on FIG. 5, when the flap 58 is closed, arm 62d and the centerline axis of rod 62a are in an over-center position that forces the piston rod to stay in its retracted position. This is the locking mechanism of the flap in its closed position. Consequently the actuator does not need to be energized to maintain the flap in its closed position, and there is no need for an independent locking mechanism.

For opening the flap, the actuator is energized and the piston rod extends to break the over-center position of arm 62d and rod 62a. Once this is achieved, the actuator can be de-energized, as the static pressure differential that is acting on the flap will drive the flap to its opened position. Consequently there is no energy required to maintain the flap in its fully opened position. The actuator 64 can be electro-mechanical, electro-hydraulic or pneumatic. With reference to FIG. 7, when flap 58 is opened, it opens the secondary conduit 52 formed by the endwall, partition, inner fan duct, and outer fan duct of the translating sleeve.

In a first and simplest mode of operation the flaps are either closed or opened, whether there is one or two flaps on the in board and outboard C-ducts. In an alternate configuration, and in the case two flaps are installed on the in board and two flaps on the outboard C-ducts, then for takeoff up to a predetermined altitude, all flaps are opened and the total fan exhaust area is equal to the accumulation of areas from the primary and secondary outlets.

From that preset altitude to part of climb, one flap on the outboard C-duct and its equivalent one on the in board C-duct are closed. In this condition the total fan exhaust area is equal to the accumulation of areas of the two primary outlets and two secondary outlets. For the remainder of the climb and cruise, all four flaps are closed and the total fan exhaust area is equal to the accumulation of areas of the two primary outlets only.

In another mode of controlling the position of the flaps, open or close, it is also possible to use a completely passive system, i.e., it is possible to totally eliminate all components of the actuation means previously described. In this mode of realization, each of the flaps is maintained closed by at least a calibrated spring 68 illustrated in FIGS. 9 & 10. The springs are calibrated to deliver a force that generates a closing moment around the pivoting axis of the flaps, and that is greater than the opening moment generated by the static pressure differential acting on each flap in cruise. This ensures that each flap is closed in cruise.

Since for takeoff the static differential pressure acting on each flap is greater than the one in cruise, then the moment that is generated by the static pressure is greater than the closing moment that is generated by the spring. This causes each flap to open and stay open until the static differential pressure drops to the value it has in cruise. While the spring shown in FIGS. 9 & 10 is of the leaf spring type, it will be understood that any other spring could be used instead.

It may be desirable when all flaps are closed (each half C-duct is in the cruise configuration) to blow ambient air through each of the secondary outlets 54. This ensures, in cruise, the elimination of the base area formed by the areas thereof with the flaps closed. As shown in FIG. 3, and as an example, this can be realized by providing an ambient air inlet in the outer skin and an outlet in the outer fan duct of the translating sleeve. The inlet and outlet-are connected to the flow shunt or conduit 66. The air inlet can be located in any other area of its associated half C-duct, for example between the two half C-ducts.

With reference to FIG. 8 the outlet of conduit 66 for supplying ambient air to the secondary duct 52 is now located in the endwall 48. In this embodiment, it is necessary to only connect one extremity of the conduit 66, to either the inlet or the outlet thereof for allowing the opening of each half C-duct for maintenance access to the engine.

Still in reference to FIG. 8, the outlet of conduit 66 is attached to wall 48 that has been provided with a corresponding opening, and its inlet seals with the nacelle that holds the ambient air inlet and that is located between the two half C-ducts. Conduit 66 supplies outside ambient air that is blown through the secondary duct 52 when the flap is closed. A similar air ambient supply means is provided for each of the secondary outlets so that the external air is blown through these outlets when the associated flaps are closed.

The adjustment of the fan exhaust area in the bifurcated fan nozzle is simple, and with all flaps opened, i.e., during takeoff, it will reduce the difference in velocity between the fan airflow and the ambient air, and consequently will reduce the noise. Another characteristic of the fan nozzle is that it does not reduce the amount of acoustic treatment that is usually installed on the C-duct. This means that the fan nozzle provides a means to further reduce the noise emitted by the turbofan engine during takeoff.

While the above description relates to a short nacelle C-duct type with separate flow, i.e., the fan air and the core gases having separate exhaust nozzles, the above flap arrangement can be installed on a long nacelle C-duct type, i.e., the fan air and the core gases have a common exhaust nozzle. While FIG. 2 shows that the trailing edges of the C-ducts are planar, they can be any shape.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

What is claimed is:

1. A turbofan exhaust nozzle comprising:
   a fan nacelle surrounding a core cowling to define an arcuate fan duct radially therebetween for discharging fan air;
   said fan duct including a longitudinal endwall interrupting circumferential continuity thereof, and a partition spaced from said endwall to define a secondary flow duct;
   said fan duct having an arcuate primary outlet disposed radially between said cowling and a trailing edge of said nacelle, and said secondary duct having a secondary outlet disposed between said cowling and nacelle trailing edge; and
   said partition including an aperture covered by a movable flap.

2. A nozzle according to claim 1 further comprising means for selectively moving said flap from a stowed position blocking said aperture to a deployed position unblocking said aperture for discharging fan air through both said primary and secondary outlets.

3. A nozzle according to claim 2 wherein said moving means are configured to deploy said flap during takeoff operation of a turbofan engine configured for discharging said fan air through said fan duct.

4. A nozzle according to claim 3 wherein said moving means are configured to stow said flap during cruise operation of said turbofan engine at a selected altitude.

5. A nozzle according to claim 3 wherein said secondary outlet is sized to increase discharge flow area during takeoff operation for reducing flow velocity of said discharged fan air.

6. A nozzle according to claim 3 wherein said secondary outlet is sized to increase discharge flow area during takeoff operation for increasing takeoff thrust from said discharged fan air.

7. A nozzle according to claim 3 wherein said moving means comprise a hinge mount pivoting an upstream end of said flap from said partition, with a downstream end of said flap being movable inside said secondary duct for unblocking said aperture.

8. A nozzle according to claim 7 wherein said moving means further comprise:
   articulated linkage joined to said flap for kinematically controlling pivotal movement thereof between said stowed and deployed positions; and
   an actuator operatively joined to said linkage for selectively deploying and stowing said flap atop said partition aperture.

9. A nozzle according to claim 8 wherein said linkage comprises:
   a control rod pivotally joined to said endwall, and including an input lever at one end, and a pair of output levers spaced apart therefrom;
   a pair of control arms pivotally joined to said flap and to respective ones of said output levers; and
   said actuator includes an output rod pivotally joined to said input lever for selectively rotating said control rod to drive said control arms to open and close said flap atop said partition aperture.

10. A nozzle according to claim 9 wherein said control arms are inclined forward toward said control rod to join said output levers between said control rod and flap in said stowed position to self-lock said flap closed with said actuator output rod being retracted.

11. A nozzle according to claim 10 wherein said input lever is angularly spaced from said output levers to pivot adjoining ends of said control arms between said control rod and said endwall to permit static pressure of said fan air atop said flap to drive open said flap.

12. A nozzle according to claim 7 wherein said moving means further comprise a spring disposed between said flap and endwall for spring biasing closed said flap atop said partition aperture in said stowed position, with said spring being sized to permit static pressure on said flap during takeoff operation to overcome spring force in said spring for opening said flap away from said partition aperture.

13. A nozzle according to claim 12 wherein said spring comprises a plurality of leaf springs mounted at opposite ends between said flap downstream end and said endwall.

14. A nozzle according to claim 3 further comprising a flow conduit extending through said fan nacelle in flow communication with said secondary duct for channeling ambient air external of said nacelle into said secondary duct for discharge through said secondary outlet.

15. A nozzle according to claim 14 wherein said flow conduit includes an inlet in an outer skin of said nacelle, and an outlet in said secondary duct.

16. A turbofan exhaust nozzle comprising:
   a fan nacelle surrounding a core engine cowling with arcuate portions joined together at circumferentially opposite endwalls to define a pair of C-shaped fan ducts for discharging fan air therefrom;
   each of said fan ducts including a partition spaced from one of said endwalls to define a corresponding pair of secondary flow ducts;

said pair of fan ducts having corresponding primary outlets disposed radially between said cowling and a trailing edge of said nacelle;

said pair of secondary ducts having corresponding secondary outlets adjoining said primary outlets;

said partitions including respective apertures covered by corresponding flaps; and means for selectively moving said flaps between stowed and deployed positions for correspondingly blocking and unblocking said partition apertures.

17. A nozzle according to claim 16 wherein said moving means are configured to deploy said flaps during takeoff operation of a turbofan engine configured for discharging said fan air through said fan ducts.

18. A nozzle according to claim 17 wherein said moving means are further configured to stow said flaps during cruise operation of said turbofan engine at a selected altitude.

19. A nozzle according to claim 18 wherein said moving means comprise a hinge mount pivoting an upstream end of each of said flaps from a corresponding partition, with a downstream end of said flaps being movable inside corresponding ones of said secondary ducts for unblocking said partition apertures.

20. A nozzle according to claim 19 wherein said moving means are active; and include an actuator for deploying said flaps.

21. A nozzle according to claim 19 wherein said moving means are passive, and utilize static pressure of said fan air to selectively deploy open said flaps.

22. A nozzle according to claim 19 further comprising means for channeling air through said secondary ducts when said flaps are stowed closed atop said partition apertures.

23. A nozzle according to claim 22 wherein said channeling means are configured for channeling ambient air external of said nacelle through said secondary ducts when said flaps are stowed closed.

24. A nozzle according to claim 19 further comprising a pair of said secondary ducts, partitions, and flaps disposed at said endwalls on one side of said core engine cowling, and another pair of said secondary ducts, partitions, and flaps disposed at said endwalls on an opposite side of said core engine cowling.

25. A method of reducing noise in a turbofan engine having a fan discharging fan air through a fixed flow area outlet in a fan nozzle defined between a fan nacelle and core engine cowling comprising increasing circumferential extent of outlet flow area in said fan nozzle during takeoff operation of said engine for correspondingly reducing velocity of said fan air being discharged therefrom, and terminating said area increase at cruise operation of said engine at altitude.

* * * * *